R. W. HARDIE.
AIR MOISTENING AND HEATING SYSTEM.
APPLICATION FILED MAY 6, 1919.
1,342,214.
Patented June 1, 1920.
2 SHEETS—SHEET 1.
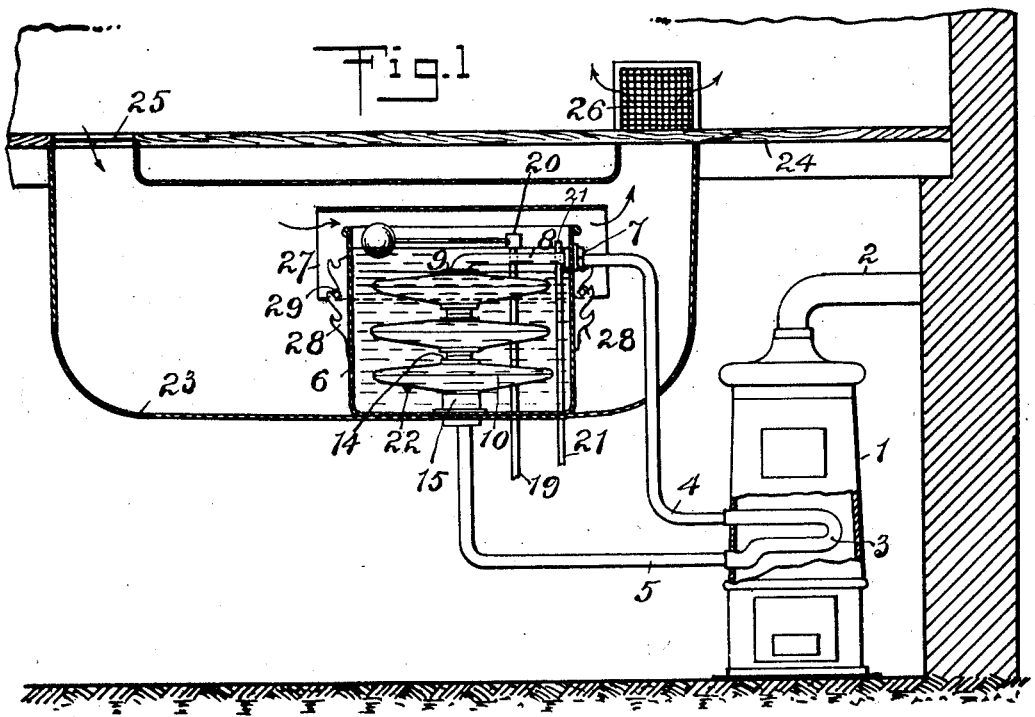
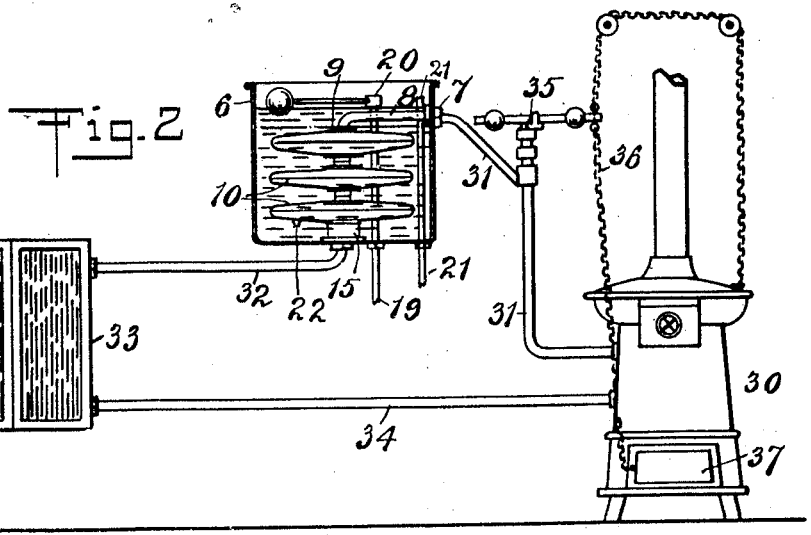
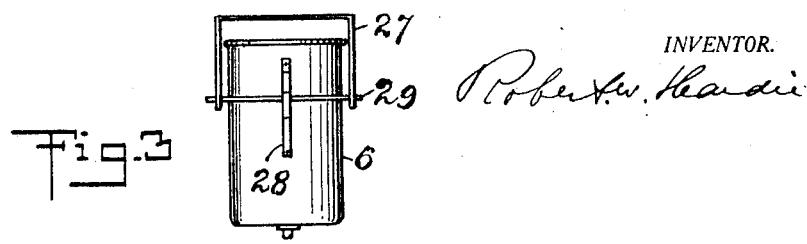
INVENTOR.
Robert W. Hardie

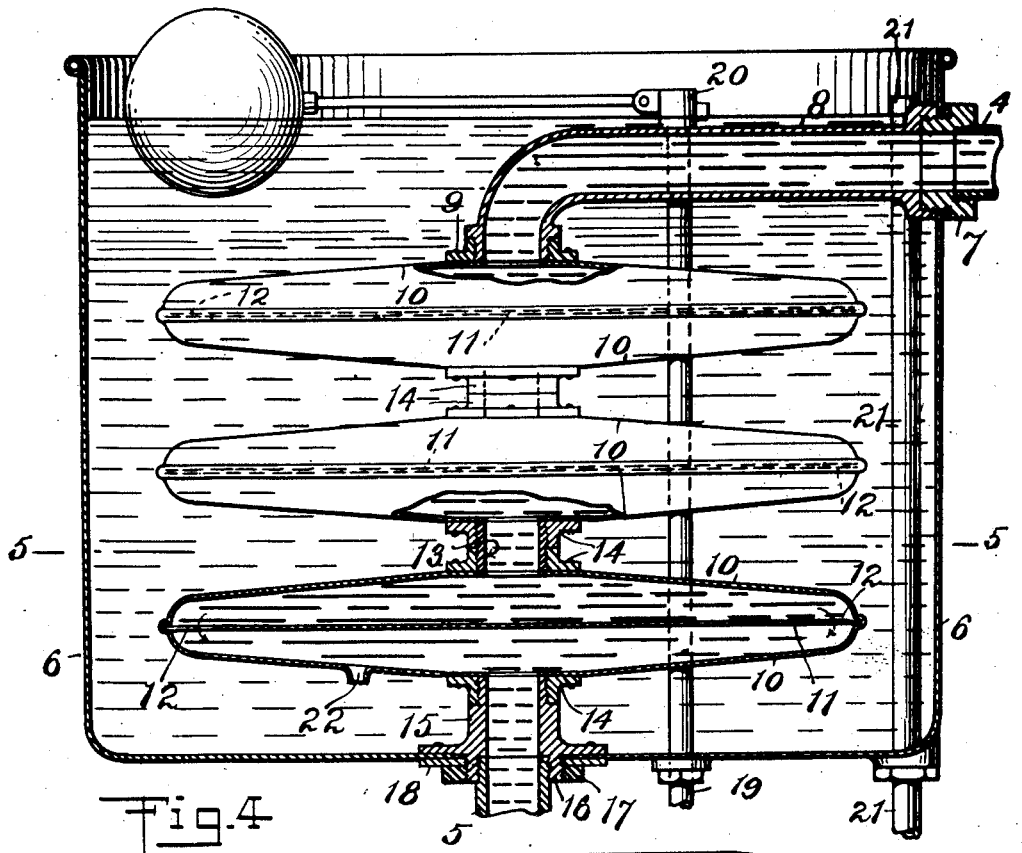
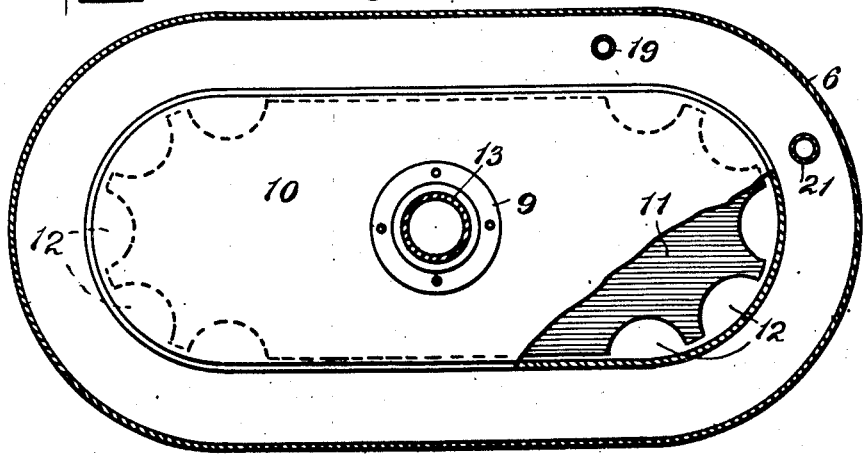

UNITED STATES PATENT OFFICE.

ROBERT W. HARDIE, OF WHITE PLAINS, NEW YORK, ASSIGNOR TO R. W. HARDIE COMPANY, INC., A CORPORATION OF NEW YORK.

AIR MOISTENING AND HEATING SYSTEM.

1,342,214.  Specification of Letters Patent.  Patented June 1, 1920.

Application filed May 6, 1919. Serial No. 295,164.

*To all whom it may concern:*

Be it known that I, ROBERT W. HARDIE, a citizen of the United States, and a resident of White Plains, in the county of Westchester and State of New York, have invented a new and useful Air Moistening and Heating System, of which the following is a specification.

This invention has for its primary object to provide means, simple in construction, effective in operation, and durable in use, for supplying heat and the desired percentage of humidity to an indoor atmosphere.

To that end the invention is directed toward providing an open-topped receptacle for holding water, and a heating member within said receptacle, and in providing a circulating current of hot water passing through said heating member for the purpose of vaporizing the water in the receptacle, and also in providing means for reheating the circulating current of water at a predetermined point in its circuit.

One of the objects of the invention is to provide a heating and air moistening system of the character described, having means for regulating the quantity of water vaporized in the receptacle, and consequently regulating the amount of vapor diffused into the atmosphere.

A further object of the invention is to provide means for conveying the moistened air from the receptacle to the desired location indoors, in the most facile, economical and satisfactory manner.

The invention has for its object also to provide a heating and air moistening system adapted to be used in dwelling houses, garages and the smaller classes of business structures.

The purpose of using a circulating current of hot water as a medium for heating the water in the receptacle, is to provide as nearly as possible a constant temperature in the water and avoid rapid variation in the temperature such as would be likely to happen if steam were used as a heating medium.

Where a hot water system is used for heating a dwelling or other structure it commonly happens that the indoor temperature may be maintained at 70° F. while the water in the boiler is at a temperature of 110 or 120° F., and at the same time the humidity in the atmosphere of the structure may be only 15 or 20 per cent.

If the water be taken from the boiler of the heating system of the dwelling to heat the water in the receptacle at such times and under such conditions, the temperature of the hot water would be considerably reduced by the time it reached the air moistener, and at the reduced temperature would be ineffective for vaporizing the water in the receptacle of the air moistener.

One of the objects of the invention, therefore, is to provide a circulating current of hot water independent of the circulation of the main hot-water heating system of the dwelling, and in maintaining in such independent or auxiliary circulating system a temperature higher than that of the water in the boiler, and in that way provide sufficient heat for vaporizing the water in the receptacle of the air moistener, and producing the desired per cent. of humidity, even though the temperature of the water in the boiler itself would be insufficient for that purpose.

In some instances, however, and in localities where the temperature of the water in the boiler of the heating system of the dwelling is maintained at a temperature sufficiently high to be effective in the air moistener, *i. e.* from 140° to 200° F., then the water in the boiler may be used for heating the water in the receptacle of the air moistener.

In some instances, moreover, it is desirable to have an air moistening system entirely independent of the main heating system of the dwelling, and in such cases the boiler is used principally for the purpose of supplying hot water as a heating medium for the air moistener and the temperature of the water in the boiler may be regulated as desired.

Although this invention is designed in most instances to be used with a hot water circulating current for the heating member of the air moistener, some of the elements of the invention, such as the air moistener proper, the water receptacle and its heating member, may be used in connection with steam as a heating medium. In using a circuit of hot water as a heating medium for the heater of the air moistener some means must be provided for the expansion of the water in the heating circuit, and for keeping the circuit filled with water to provide a continuous circulation; and a further object of the invention is to provide means for so doing.

With the foregoing and other objects in view hereinafter stated, the invention consists in the novel construction, combination and arrangement of parts, hereinafter more specifically described, and illustrated in the accompanying drawings, wherein is shown the preferred embodiment of the invention, but it is understood that changes, variations and modifications may be resorted to without changing the scope of the invention.

In describing the invention in detail, reference is had to the accompanying drawings which form a part of this specification and wherein like characters of reference denote corresponding parts throughout the several views, and wherein—

Figure 1 is a diagrammatic view of an air moistening system embodying my invention, some of the elements being shown in section.

Fig. 2 is a diagrammatic view of an air moistening and heating system, showing a modification of the invention.

Fig. 3 is an end elevation of the air moistener proper.

Fig. 4 is a cross section of the air moistener showing some of the parts in side elevation, and Fig. 5 is a horizontal section taken on the line 5—5 of Fig. 4, partly broken away.

As illustrated in the drawings, 1 represents a boiler of ordinary construction, preferably of the hot water pattern, having the usual smoke pipe 2 leading into a chimney.

The interior of the furnace of the boiler is provided with a waterback or water container 3 of any suitable construction auxiliary to the main water chamber of the boiler, having one of its ends connected with an inlet or admission pipe 4, and its opposite end connected with a return pipe 5. The inlet pipe 4 is connected with the upper end of a heating member arranged within an open topped receptacle 6, and the return pipe 5 connects with the lower end of said heating member.

The inlet-pipe 4 is connected with the interior thread of a bushing 7 that has an exterior thread engaging the interior thread of one end of an extension 8 of the inlet-pipe 4. The other end of said extension is threaded and engages the interior thread of a collar 9 that is attached to one of a series of sections comprising the heating member of the air moistener, and communicates with the interior of said section. The sections of the heating members are preferably constructed of oppositely disposed concavo-convex plates 10 secured together in any suitable manner at their outer edges. The meeting edges of said plates preferably hold in place the outer edge of a baffle plate 11, that is cut away at its ends to form apertures 12 through which the heating medium passes from the center of the upper chamber to the lower chamber of the sections of the heating member. The sections of the heating member are connected together in any suitable manner, as by nipples 13 engaging collars 14 attached to said sections at the central or axial line thereof.

The lower collar of the lowest section of the heating member engages a tubular support 15, that is provided with a flange secured to the bottom of the water bearing receptacle, and with a collar 16 that extends through the bottom of said receptacle and is provided with an exterior thread engaging a clamping nut 17 and a washer 18 to securely hold the tubular support 15 to the bottom of the receptacle and make a tight joint between said parts.

Water is let into the receptacle by means of a pipe 19 connected with the water supply of a building, and provided with a float valve 20 of any suitable construction.

The receptacle is also provided with an overflow pipe 21. The upper end of the overflow pipe 21, extends above the top of the extension 8 of the inlet or admission pipe, so that by the aid thereof and the float valve 20 the surface of the water in the receptacle is maintained above the pipe 8 and therefore the water circuit will not be broken by the water receding from, or running out of the pipe 8.

The lowest section of the heating member is provided with an opening 22 so as to make communication between the interior of said section and that of the receptacle for a purpose hereinafter stated.

An interior thread on the collar 16 of the support 15 engages the end of the return pipe 5, and completes a hot water circuit through the pipe 5, the water back 3, the inlet pipe 4, its extension 8, the sections of the heating member to the return pipe 5.

As the water in the circuit passes into the water back 3, it is subjected to the heat of the fire in the furnace of the boiler, and its temperature is thereby raised, and the water is then forced up the inlet or admission pipe 4 and into the sections of the heating member.

The heat from the surface of the sections of the heating member quickly vaporizes the water in the receptacle and diffuses it into the atmosphere, thereby raising the percentage of humidity therein.

As the water in the circuit becomes heated, it expands, and the purpose of the opening 22 in the lower part of the lowest section of the heating member is to permit part of the water to flow out of the water circuit or heating member to compensate for the increase in bulk due to its expansion.

When the temperature of the water is reduced, and its bulk contracted, enough water will then flow back into the heater through the opening 22 which is below the water level of the receptacle to completely fill the heating member.

By means of said construction a closed hot water circuit is provided without the necessity of using an expansion tank or similar device.

Where a water back is used within the furnace of a hot water or steam boiler, the boiler may in addition to said water back have the usual water chambers for producing hot water or steam within said boiler to supply the radiators of a house or other building.

While it is possible to place the air moistener wherever desired, the preferable location therefor is within a casing 23 located in the basement of a house, and attached to the under side of the first floor 24. An opening may be made in the floor at the coolest part of a room or hall and lead into the interior of said casing, and another opening may be made in the floor or in the wall at the other end of the casing, and the openings covered by registers 25 and 26. By means of such construction the cooler air, because of its weight, descends through the register 25 and passes over the top of the receptacle 6, and carries the vaporized air up through the register 26 into the atmosphere of the room or building.

A hood 27 may be placed over the top of the water receptacle if desired, to aid in carrying the vaporized air off from the top of the water in the receptacle. The hood is open at its ends and its sides inclose the top of the sides of the receptacle, so as to induce the flow of a current of air over the surface of the water in the receptacle. The ends of the receptacle may be provided with racks 28, which may be engaged by rods 29 supporting the ends of said hood, so that either end of the hood may be placed at any desired distance above the top of the water receptacle.

In some instances it is preferable to dispense with the auxiliary water back in the furnace and to take the hot water for the air moistener from the main water chamber of the boiler.

As illustrated in Fig. 2, a boiler is provided which may be of the ordinary hot water pattern with water chambers built into the boiler, either in the form of a water jacket or the form used for larger boilers. From the water chamber of the boiler a supply pipe 31 leads to the interior of the heating member in the manner already described.

After passing through the heating member of the air moistener the heating medium may pass through a connecting pipe 32 and into a wall or other radiator 33, and from the radiator back to the water chamber of the boiler, through a return pipe 34.

One of the advantages of such a construction is that the temperature of the water in the heating system may be regulated in the boiler by means of a heat regulator 35 of any suitable construction, connected with the inlet or supply pipe 31. The heat regulator illustrated herein is provided with a lever having adjustable weights, and the lever is connected with a cable or chain 36, one end of the chain being connected with the draft door 37 at the lower part of the furnace, and the other end of the chain is connected with a check damper, not shown.

The regulator is provided interiorly with a diaphragm which, by expanding causes the lever to close the lower draft door of the furnace and open the check damper at the rear. When the diaphragm contracts the lower draft door is opened and the check damper is closed.

When constructed as described with the hot water heat generator provided with a main water chamber and an auxiliary water back or container, the temperature of the water used as a heating medium for the air moistener may be maintained at a higher temperature than the water in the general heating system of a house so as to furnish ample humidity even when the temperature of the water in the house heating system would not be sufficient of itself to do so. When such construction is used, the hot water heat generator performs the function of heating water in the main water chamber for heating a building, and also the function of heating the water in the circuit containing the water back and the heater for the air moistener. As the temperature of the water in the main water chamber of the heat generator rises, the temperature of the indoor atmosphere also rises and its capacity for holding moisture, and its need of more moisture, is increased. By virtue of the coöperative relation between the main hot water heating circuit and the auxiliary air moistening circuit, and their relation to the hot water heat generator, as the need for an increase of humidity or moisture is developed by the rise in temperature of the water in the main water circuit, that need is supplied by a simultaneous rise in the temperature of the water in the auxiliary circuit, causing an increased output of aqueous vapor from the receptacle of the air moistener.

That coöperative relation between the rise and fall of the temperature of the water in the main circuit, and that of the auxiliary circuit is constant and automatic, but within different ranges of temperature, the temperature of the water in the auxiliary circuit being higher than that of the main circuit, due to the fact that the auxiliary water back or container is exposed nearer than the main water receptacle to the fire in the furnace of the heat generator, and contains a smaller quantity of water than the main water chamber of the generator. When an independent air moistening system is used in a house, the temperature of the water used as a heating medium for the heater of the air moistener may be regulated as desired, and even without a regulator, its temperature will be more steady and uniform than if steam be used as a heating medium.

The air moistener, moreover, serves as a heater, more effective than a radiator in proportion to its area, for the reason that water forms a much better radiating surface than iron, and considerable heat is radiated from the surface of the water in the receptacle. The air moistening system may be used without the radiator, and the specific construction shown and described herein for the air moistener proper, and for the heater in the furnace are not essential features of the invention. Other forms of heaters in the furnace and other forms of heating member of the air moistener may be used without departing from the invention.

In Fig. 2, but one radiator is shown, but any desired number of radiators may be used to comprise a complete heating system for an entire house, with the air moistener receptacle arranged as shown above the level of the radiators, the receptacle serving as an open expansion tank and as a vaporizing receptacle.

What I claim as new and desire to secure by Letters Patent is:

1. In an apparatus of the character described, the combination of an open-topped receptacle for holding water to be vaporized and for use as an expansion tank, a heater within the receptacle provided with an aperture opening from the interior of the heater into the interior of the receptacle below the water level of the receptacle, a heat generator, pipe connections from the heat generator to the inlet end of the heater, a radiator below the level of said receptacle, and pipe connections between the heat generator and radiator, and between the radiator and heater.

2. In an apparatus of the character described, the combination of an open-topped receptacle serving as an expansion tank and as means for exposing to the atmosphere a quantity of water to be vaporized, a heater within the receptacle provided with an aperture opening from the interior of the heater into the interior of the receptacle, below the water level of the receptacle, means for supplying water to the interior of the receptacle, and means for supplying a heating medium to said heater.

3. In an apparatus of the character described, the combination of a casing having a closed body and open ends, an open-topped receptacle in said casing for exposing to the atmosphere water to be vaporized, a heater within the receptacle, a hood having open ends, and depending sides inclosing the top of the side walls of the receptacle, means for supplying a heating medium to the heater, and means for supplying water to the receptacle.

4. In an air moistening and heating system, the combination of a heat generator, an open-topped receptacle for exposing to the atmosphere water to be vaporized, and a hot water circuit embracing a water back within the heat generator, a heater within the receptacle having an aperture opening from the interior of said heater into the interior of said receptacle below the water level of the receptacle, and pipe connections between the water back and the inlet end of the heater, and between the outlet end of the heater and the water back.

5. The combination of an open topped water containing receptacle, a heater within said receptacle, a hood having open ends arranged over the receptacle and provided with depending sides inclosing the upper part of the side walls of said receptacle, means for supplying a heating medium to said heater, and means for supplying water to said receptacle.

6. In a heating and air moistening system, a hot water heat generator, an open topped water containing receptacle, a float operated valve for supplying water to said receptacle, a heater within said receptacle having an aperture opening from the interior of said heater into the interior of said receptacle below the water level of said receptacle, tubular connections between the heat generator and the interior of said heater, a radiator below the level of said receptacle, tubular connections between the upper part of said radiator and the lower part of said heater, and tubular connections between the lower part of said radiator and said generator.

7. The combination of an open-topped water containing receptacle, a heater within said receptacle, spaced from the wall thereof and provided with an aperture opening from the interior of said heater into the interior of said receptacle below the water level of said receptacle, an inlet pipe connection opening into the upper part of one end of said heater, and an outlet pipe connection opening into the lower part of the opposite end of said heater.

ROBERT W. HARDIE.

Witnesses:
M. C. LYDDANE,
D. LEWIS MATTERN.